US012531885B1

(12) United States Patent
 Averbuch et al.

(10) Patent No.: US 12,531,885 B1
(45) Date of Patent: Jan. 20, 2026

(54) SYSTEM AND METHOD FOR IDENTIFYING THE CAUSE OF AN UNDESIRABLE EVENT

(71) Applicant: ThetaRay Ltd., Hod HaSharon (IL)

(72) Inventors: Amir Averbuch, Hod HaSharon (IL); David Segev, Hod HaSharon (IL)

(73) Assignee: ThetaRay Ltd., Hod HaSharon (IL)

( * ) Notice: Subject to any disclaimer, the term of this patent is extended or adjusted under 35 U.S.C. 154(b) by 239 days.

(21) Appl. No.: 18/337,200

(22) Filed: Jun. 19, 2023

Related U.S. Application Data

(60) Provisional application No. 63/353,666, filed on Jun. 20, 2022.

(51) Int. Cl.
 *H04L 9/40* (2022.01)
(52) U.S. Cl.
 CPC ............................... *H04L 63/1425* (2013.01)
(58) Field of Classification Search
 CPC ............. H04L 63/1425; H04L 63/1408; H04L 41/0631
 See application file for complete search history.

(56) References Cited

U.S. PATENT DOCUMENTS

| | | | |
|---|---|---|---|
| 11,595,415 B2 * | 2/2023 | Stergioudis | G06N 20/00 |
| 2017/0201897 A1 * | 7/2017 | Yang | H04L 43/16 |
| 2021/0120027 A1 * | 4/2021 | Dean | H04L 63/1425 |
| 2021/0176116 A1 * | 6/2021 | Sharma | H04W 24/04 |
| 2022/0118619 A1 * | 4/2022 | Sukhwani | B25J 9/1674 |

* cited by examiner

*Primary Examiner* — Mohamed A. Wasel
(74) *Attorney, Agent, or Firm* — Nathan & Associates Patent Agents Ltd.; Menachem Nathan

(57) ABSTRACT

Methods that rate (i.e., ranks) the parameters (features) that cause a specific abnormal behavior to occur. It is assumed that the anomalies have already been detected by other anomaly detection methods. A method uses an algorithm based on the underlying potential of the diffusion process that is used in Diffusion Maps to reduce the dimensionality of the data. The gradient of this potential indicates the direction from an anomaly to a cluster that represents a normal behavior. This direction is used to rate the parameters that cause an abnormal behavior to occur.

18 Claims, 7 Drawing Sheets

SYSTEM AND METHOD FOR IDENTIFYING THE CAUSE OF AN UNDESIRABLE EVENT

CROSS REFERENCE TO RELATED APPLICATIONS

This application claims the benefit of priority from U.S. provisional patent application No. 63/353,666 filed Jun. 20, 2022, which is incorporated herein by reference in its entirety.

FIELD

Embodiments disclosed herein relate in general to methods and systems for finding a cause of an undesirable event from analysis of data including multidimensional datapoints (MDDPs).

BACKGROUND

Detection of undesirable events (also known as "anomaly detection") is an important part of the analysis of high dimensional big data comprising multidimensional datapoints (MDDPs). As used herein, the term "undesirable event" may refer to an event selected from the group consisting of (but not limited to) a cyber-threat, a cyber-attack, malware presence, an operational malfunction, an operational breakdown, a process malfunction, a process breakdown, a financial risk event, a financial threat event, a financial fraud event and a financial network intrusion event. In the following, "datapoint" is equivalent to "MDDP".

Anomaly detection may be performed by applying dimensionality reduction methods to obtain a low-dimensional space, which reveals the geometry and the patterns that exist in big multidimensional data and govern them. Usually, anomaly detection methods classify MDDPs (or big multidimensional vectors that represent them) as either normal or abnormal (anomalous), an abnormal MDDP (also referred to simply as "anomaly") reflecting an undesirable event.

The diffusion maps (DM) methodology (R. Coifman, S. Lafon, "Diffusion Maps", Applied and Computational Harmonic Analysis, 21 (1), 5-30, 2006) analyzes datasets by exploring their underling geometry. DM computes a family of embeddings of a dataset into Euclidean space (often low-dimensional) whose coordinates can be computed from the eigenvectors and eigenvalues of a diffusion operator on the data. The Euclidean distance between data points in the embedded space is equal to the "diffusion distance" between probability distributions centered at those points. DM focuses on discovering the underlying manifold that the data has been embedded into. By integrating local similarities at different scales, diffusion maps give a global description of the dataset.

The goal of DM is to find a set of n multidimensional data points $y_1, \ldots, y_n \in R^d$, that maps the set $x_1, \ldots, x_n \in R^d$ into a smaller dimension. A similarity matrix (also called kernel matrix) $W \in R^{n \times n}$ is built. $W_{ij}$ is symmetric and non-negative distance matrix between datapoints in the original (source) datapointa.

The DM methodology is based on the isotropic kernel:

$$k_\varepsilon(x, y) \Box e^{-\frac{\|x-y\|^2}{\varepsilon}} \quad (1)$$

where x, y ∈X are datapoints from X⊆☐" and ε is a meta-parameter of the algorithm. This kernel represents the affinities between datapoints. The kernel is a matrix of size m×n where m is the number of datapoints and n is the number of features (parameters) in each datapoint (also called "dimension"). The kernel can be viewed as a construction of a weighted graph over the set X, using its datapoints as nodes and its geometry to define the weights of the edges. The degree of each datapoint in this graph is defined by:

$$p_\varepsilon(x) \Box \int_X k_\varepsilon(x, y) dy. \quad (2)$$

EQ. 2 is the summation of a row in the kernel matrix. By normalizing the kernel with this degree, we obtain a transition operator $$M(x, y) = \frac{k_\varepsilon(x, y)}{p_\varepsilon(x)}$$

that defines a Markov (i.e., a diffusion) process over the datapoints in the dataset. The eigenvalues $1=\lambda_0 \geq \lambda_1 ¢ \ldots$ of the operator M and their corresponding eigenfunctions $\{\phi_i\}$ are used to obtain dimensionality reduction by mapping each datapoint x∈X onto the datapoint $$\Phi(x) = (\lambda_i \phi_i(x))_{i=0}^{K}$$

for a sufficiently small K. This construction is also known as the "graph Laplacian" constructed by the kernel (EQ. 1).

The Euclidean distances in the embedded space correspond to the diffusion distances in the original space. Therefore, the datapoints that represent normal behavior will be clustered together to form dense areas, while the anomalies will lie in sparse areas. DM is used to achieve clustering (lower dimensional manifold with normal data) and to find anomalies in sparse areas.

Revealing the parameters (i.e., features) that cause anomalous behavior is critical in many applications to understand the root cause of the problem. However, this problem is not addressed by known anomaly detection methods and, specifically, by nonparametric methods, which are based on feature-free analysis of the data. Therefore, there is a need for, and it would be advantageous to have methods that identify the parameter(s) most responsible for anomalous behavior.

SUMMARY

This disclosure provides methods that rate (i.e., rank) the parameters that cause a specific abnormal behavior to occur, as well as a system for performing such methods. It is assumed that the anomalies have already been detected by other anomaly detection methods, so they are known. The rating of parameter(s) is based on the analysis of a kernel method behavior that leads to dimensionality reduction. The methods speed up substantially the forensic time needed for a user to understand why a datapoint was marked as an anomaly.

We use the fact that a gradient of the potential (defined below) of an abnormal datapoint (anomaly) indicates the direction from an anomaly to a cluster that represents a normal behavior. We use this direction to rate the parameters that cause an abnormal behavior to occur. Each anomalous parameter in a datapoint is rated, i.e. assigned a number that reflects its contribution magnitude to the occurrence of the anomaly. Leading (highest) rating numbers represent more reliably a source for the anomaly occurrence. The parameter that causes an abnormal behavior to occur is assigned a number that represents its rating. The assignment of a numerical value to parameter rating is described later. Using a disclosed method, rating of the parameters of an anomaly can help in performing fast, targeted and accurate forensic.

In exemplary embodiments, there is provided a method, comprising: receiving a dataset X comprising a plurality of n-dimensional datapoints, wherein each datapoint has n parameters, wherein n≥2, and wherein X includes a normal cluster and an anomaly; calculating a gradient for each parameter of the anomaly; and using the gradient of each parameter of the anomaly to identify the parameter that contributes most to the abnormality of the anomaly, whereby if the anomaly is reflective of an undesirable event, the identification of the parameter that contributes most to its abnormality assists in the identification of a main factor causing the undesirable effect.

In exemplary embodiments, there is provided a computer program product comprising: a non-transitory tangible storage medium readable by a processing circuit and storing instructions for execution by the processing circuit for performing a method comprising: receiving a dataset X comprising a plurality of n-dimensional datapoints, wherein each datapoint has n parameters, wherein n≥2, and wherein X includes a normal cluster and an anomaly; calculating a gradient for each parameter of the anomaly; and using the gradient of each parameter of the anomaly to identify the parameter that contributes most to the abnormality of the anomaly, whereby if the anomaly is reflective of an undesirable event, the identification of the parameter that contributes most to its abnormality assists in the identification of a main factor causing the undesirable effect.

In exemplary embodiments, there is provided a computer system, comprising: a parameter rating system configured to receive a dataset X comprising a plurality of n-dimensional datapoints, wherein each datapoint has n parameters, wherein n≥2, and wherein X includes a normal cluster and an anomaly, the parameter rating system comprising a parameter rating engine configured to calculate a gradient for each parameter of the anomaly and to use the gradient of each parameter of the anomaly to identify the parameter that contributes most to the abnormality of the anomaly, whereby if the anomaly is reflective of an undesirable event, the identification of the parameter that contributes most to its abnormality assists in the identification of a main factor causing the undesirable effect.

In some embodiments, the calculating the gradient for each parameter of the anomaly includes: computing a neighborhood $N_\varepsilon(x)$ of the anomaly, centralizing $N_\varepsilon(x)$ around the anomaly to obtain a centralized neighborhood $\hat{N}_\varepsilon$ such that the anomaly becomes a new origin and each neighboring datapoint $y \in N_\varepsilon$ becomes $\hat{y}=y-x$, normalizing each $$\hat{y} \in \hat{N}_\varepsilon(x)$$

to obtain respective normalized vectors $$\frac{\hat{y}}{\|\hat{y}\|},$$

and summing the normalized vectors $$\frac{\hat{y}}{\|\hat{y}\|}$$

to obtain the gradient.

In some embodiments, the calculating the gradient for each parameter $x_i$ of the anomaly includes computing a neighborhood $N_\varepsilon(x)$ of the anomaly, finding a center of gravity $c_\varepsilon$ of abnormal datapoints in $N_\varepsilon(x)$, and identifying a vector going from the anomaly to $c_\varepsilon$ as the gradient.

In some embodiments, the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

In some embodiments, the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

In some embodiments, the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way. In the drawings.

DETAILED DESCRIPTION

Figure 1:
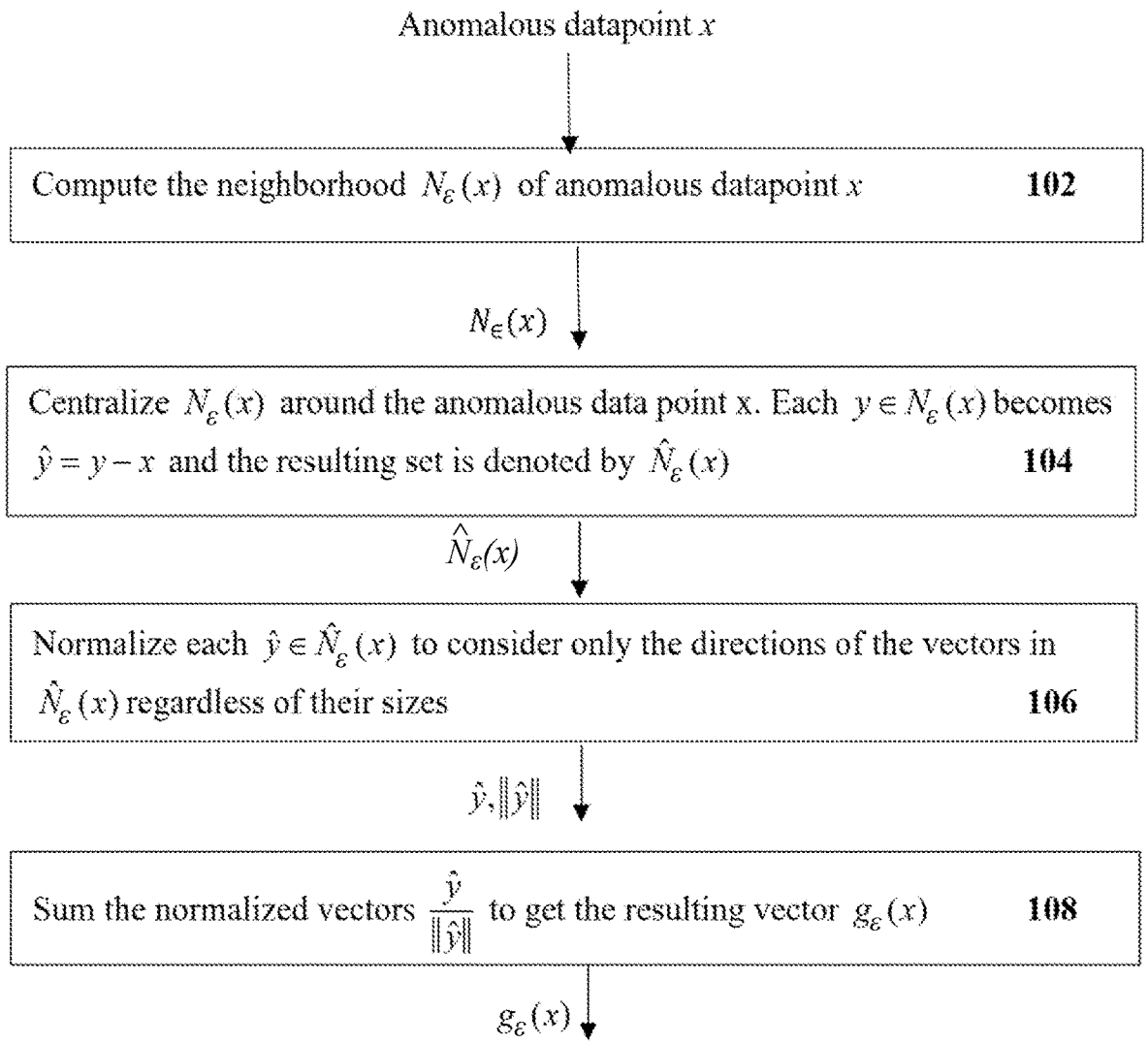
FIG. 1 illustrates in a flow chart a method for computing $g_\varepsilon(x)$ (EQ. 3)

Let $X \subseteq \square^n$, where n is the number of features (parameters) in each datapoint (sample), be a dataset of n dimensional that includes m datapoints $$x = \{x_i\}_{i=1}^m$$

where $x_i$ is a datapoint in X. Dataset X contains normal and anomalies. Assume that datapoints x in X have some probability distribution p(x), such that areas with the highest probability distribution represent normal behavior, while other areas, with lower probability distribution, represent abnormal behavior (i.e. are considered anomalous). There are two possible scenarios for the creation of such datasets:

1. The data is randomly sampled from some probability distribution p(x). We define the potential of the data by U(x)=−log p(x);
2. The data is sampled from a dynamical system in equilibrium. In this case, there is an explicit notion of time and of the transition probability densities of the system. The probability distribution in this case is defined by p(x)=exp(−U(x)).

In both scenarios, the steady state probability density is identical, and it satisfies p(x)=exp(−U(x)) and U(x) −log p(x). Therefore, the analysis takes features from the underlying potential U(x).

Use of DM

There is a connection between the constructed diffusion process (EQ.1) and the underlying potential U(x) and the degree $p_\varepsilon(x)$ (EQ. 2) that approximates the probability distribution $p_\varepsilon(x)$.

Scenario 1: Isotropic Kernel

The regions that represent normal behavior in X are usually mapped to dense clusters in the embedded space. Since a diffusion process with potential 2U(x) is used for this embedding, these high concentrations can be identified as the surrounding regions of local minima of the potential 2U(x). For now, we will assume that X has a single normal cluster with some anomalies. Thus, the potential 2U(x) should have a well-defined region with significantly less potential than elsewhere.

For an anomaly x∈X outside this well-defined region. In fact, the diffusion potential decreases most drastically in the direction of this vector, i.e. along the gradient of the potential. Thus, an advance in this direction should rapidly decrease the distance of x from the cluster. The relative contribution of each of the original features to the direction of this vector should indicate how much each feature affects the distance of x from the cluster, which eventually classifies it as an anomaly. We recall that U(x)=−log p(x). Thus, the resulting gradient is the vector:

$$g_\varepsilon(x) \Box \int k_\varepsilon(x, y) \frac{y - x}{\|x - y\|} dy. \tag{3}$$

where $g_\varepsilon(x)$ is a gradient vector marked "grad-v" of a first type.

Suppose that all the datapoints y ∈X−{x} reside in a certain concentrated region while x resides outside this region (i.e., x is considered to be an anomaly). Suppose that the anomalous behavior of x is caused solely by its $j^{th}$ coordinate. ($j^{th}$ location in the n-dimensional feature vector. In the following, $x_i$, $y_i$, $x_j$, $y_j$ refer to datapoints in X.

We examine some neighborhood of x with radius ε denoted by $N_\varepsilon(x)$. Since x is anomalous, it should be relatively far from its neighbors, which should be concentrated in an area bordering the normal region. Since the anomalous behavior of x is caused solely by its $j^{th}$ coordinate (parameter), then if we ignore the $j^{th}$ coordinate, x should be closer to its neighbors. Therefore, for most y ∈$N_\varepsilon(x)$, the effect of the difference $y_j$−$x_j$ Thus, the term $$\frac{x_j - y_j}{\|x - y\|}$$

should have an absolute value greater than $$\frac{x_i - y_i}{\|x - y\|} \text{ for } i \neq j.$$

Since we assume that there is only one distinct region of normal behavior, we may assume that x, is either significantly greater or significantly smaller than all they, for y∈$N_\varepsilon(x)$. Thus, the absolute sum of the terms $$\frac{y_j - x_j}{\|x - y\|}$$

should be significantly greater than the absolute sum of the terms $$\frac{y_i - x_i}{\|x - y\|} \text{ for } i \neq j.$$

The summation of these terms in the neighborhood $N_\varepsilon(x)$ is done by integrating them using the kernel values k(x, y) as weights (for y ∈X). We obtain $$\int k_\varepsilon(x, y) \frac{y_i - x_i}{\|x - y\|} dy$$

which is exactly the $i^{th}$ coordinate of $g_\varepsilon(x)$. Therefore, the $j^{th}$ coordinate of $g_\varepsilon(x)$ should have an absolute value greater than the absolute value of each of its other coordinates, and $g_\varepsilon(x)$ should indeed point strongly toward the direction of the $j^{th}$ axis. If x, is significantly smaller than the normal range of the $j^{th}$ coordinate in the neighborhood $N_\varepsilon(x)$, then $g_\varepsilon(x)$ should point to the positive direction of this axis. If x, is significantly greater than the normal range of the $j^{th}$ coordinate in $N_\varepsilon(x)$, then $g_\varepsilon(x)$ should point to the negative direction of this axis. Thus, not only should $g_\varepsilon(x)$ indicate the right axis causing the anomalous behavior, it also indicates the direction toward the region of normal behavior with low potential as expected. "Low potential" indicates a normal datapoint.

Suppose that all the datapoints y ∈X−{x} are concentrated in a certain region and that X does not have anomalies. We examine the change in $g_\varepsilon(x)$ as we significantly increase the value of $x_j$, causing x to have an anomalous behavior that moves it outside the normal behavioral region. The $i^{th}$ coordinate of $g_\varepsilon(x)$ is given by EQ. 4. As we increase the value of $x_j$ beyond its normal range, the terms $k_\varepsilon(x, y)$ and $\|x-y\|^{-1}$ should decrease in exactly the same way for every i. The terms ($y_i$−$x_i$) however, do not change at all for i≠j, but increase for i=j. Hence, the absolute value of the $j^{th}$ coordinate of $g_\varepsilon(x)$ should decrease less rapidly than all the other coordinates of $g_\varepsilon(x)$. Thus, as $x_j$ becomes more anomalous (causing x to be an anomaly), this coordinate will become relatively larger compared with the other coordinates. It is easy to see that the same argument also applies when $x_j$ decreases below the normal range. Therefore, as x, becomes more anomalous, $g_\varepsilon(x)$ points more toward the direction of the $j^{th}$ axis. Similar arguments can also be used when the anomaly is caused by several parameters.

The term $g_\varepsilon(x)$ has a geometric interpretation. The definition of $g_\varepsilon(x)$ is presented in EQ. 3. This definition integrates the terms $$\frac{y-x}{\|x-y\|}$$

using a weight $k_\varepsilon(x, y)$ for each y. By using the kernel values in such a way, these terms are integrated over a neighborhood of x with radius ε. The term $$\frac{y-x}{\|x-y\|}$$

is a normalized version of y−x, which is a vector that points from x to y. Thus, we can geometrically compute the vector $g_\varepsilon(x)$ as follows, see FIG. 1:

Step 102: compute the neighborhood of datapoint x, which is denoted by $N_\varepsilon(x)$;

Step 104: centralize $N_\varepsilon(x)$ around x, so that x becomes the new origin and each $y \in N_\varepsilon(x)$ becomes $\hat{y}=y-x$. Denote the resulting set by $$\hat{N}_\varepsilon(x);$$

Step 106: normalize each $$\hat{y} \in \hat{N}_\varepsilon(x)$$

so that only the directions of the vectors in $$\hat{N}_\varepsilon(x)$$

are considered, regardless of their sizes; and

Step 108: sum the normalized vectors $$\frac{\hat{y}}{\|\hat{y}\|}$$

to obtain the resulting vector $g_\varepsilon(x)$.

Hence, $g_\varepsilon(x)$ generally points to the greatest concentration of neighbors of x. This may not seem meaningful for datapoints within a dense cluster, which represents normal behavior, but for a datapoint outside the cluster, most of its neighbors should be concentrated in a bordering area of this cluster. Thus, the direction of this concentration is indeed the direction from x toward this cluster. The effect each axis has on this direction indicates how it affects the anomalous behavior of x.

Scenario 2: Isotropic Kernel—an Alternative Approach

Another kernel (vs. the one in EQ. 1) is $$K'_\varepsilon(x, y) = e^{-\frac{\|x-y\|^2}{2\varepsilon}}.$$

The degree in this case, denoted by $p'_\varepsilon$, is defined exactly in the same way as before, and so do the transition probabilities of the diffusion process which we denote by $$a(x, y) = \frac{K_\varepsilon(x, y)}{p'_\varepsilon(x, y)}.$$

All the arguments concerning the potential U (or 2U) and the probability distribution p still apply to this case. Hence, the vector $-\nabla(2U(x))$ should still point toward the concentrated region. Denote:

$$g'_\varepsilon(x) \square \int a(x, y)y dy - x. \quad (5)$$

which is a gradient vector "grad-v" of a second type.

Most of the discussion about $g_\varepsilon(x)$ also applies to $g'_\varepsilon(x)$. However, the geometric interpretation is different. The vector $g'_\varepsilon(x)$ (EQ. 5) extends from x to a datapoint defined as $$\int a(x, y)y dy.$$

Figure 2:
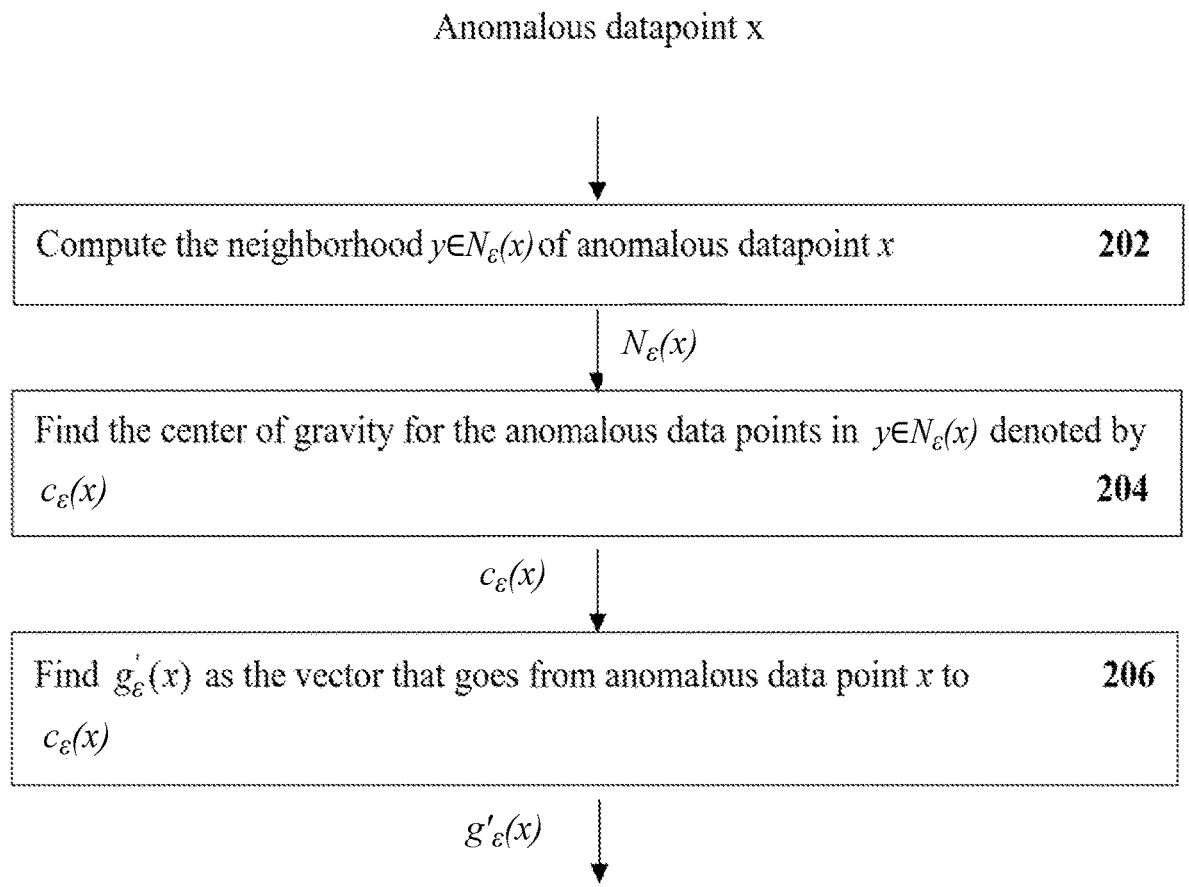
FIG. 2 illustrates in a flow chart a method for computing g (x) (EQ. 5)

Since a(x, y) is a probability distribution, this integration is a weighted average of the datapoints in the dataset. In fact, it averages the datapoints in the neighborhood $N_\varepsilon(x)$. Thus, geometrically the vector g (x) is computed as follows, see FIG. 2:

Step 202: compute the neighborhood $N_\varepsilon(x)$;

Step 204: find the center of gravity for the datapoints in $N_\varepsilon(x)$ (i.e., their average), denoted by c (x);

Step 206: obtain the resulting vector $g'_\varepsilon(x)$ going from x to $c_\varepsilon(x)$.

When x (anomalous) lies outside the main cluster, most of its neighbors lie in an area bordering the cluster. Thus, the center of gravity of this neighborhood leans toward the cluster and the direction from x toward this center of gravity points toward the cluster.

Although $g'_\varepsilon(x)$ is different from $g_\varepsilon(x)$, it can still be used to find the direction from an anomaly toward the normal cluster. Thus, it indicates the sources for an anomalous behavior.

Parameter Rating

The disclosure above describes two different kernels that can be used with DM. For each kernel, we analyze the gradients of the degrees in the graph constructed by DM. We show that the directions of these gradients should indicate the sources for abnormal behaviors. Geometric interpretations of these gradient vectors are provided, which show that for an anomaly, these gradients point toward a normal cluster.

Figure 3:
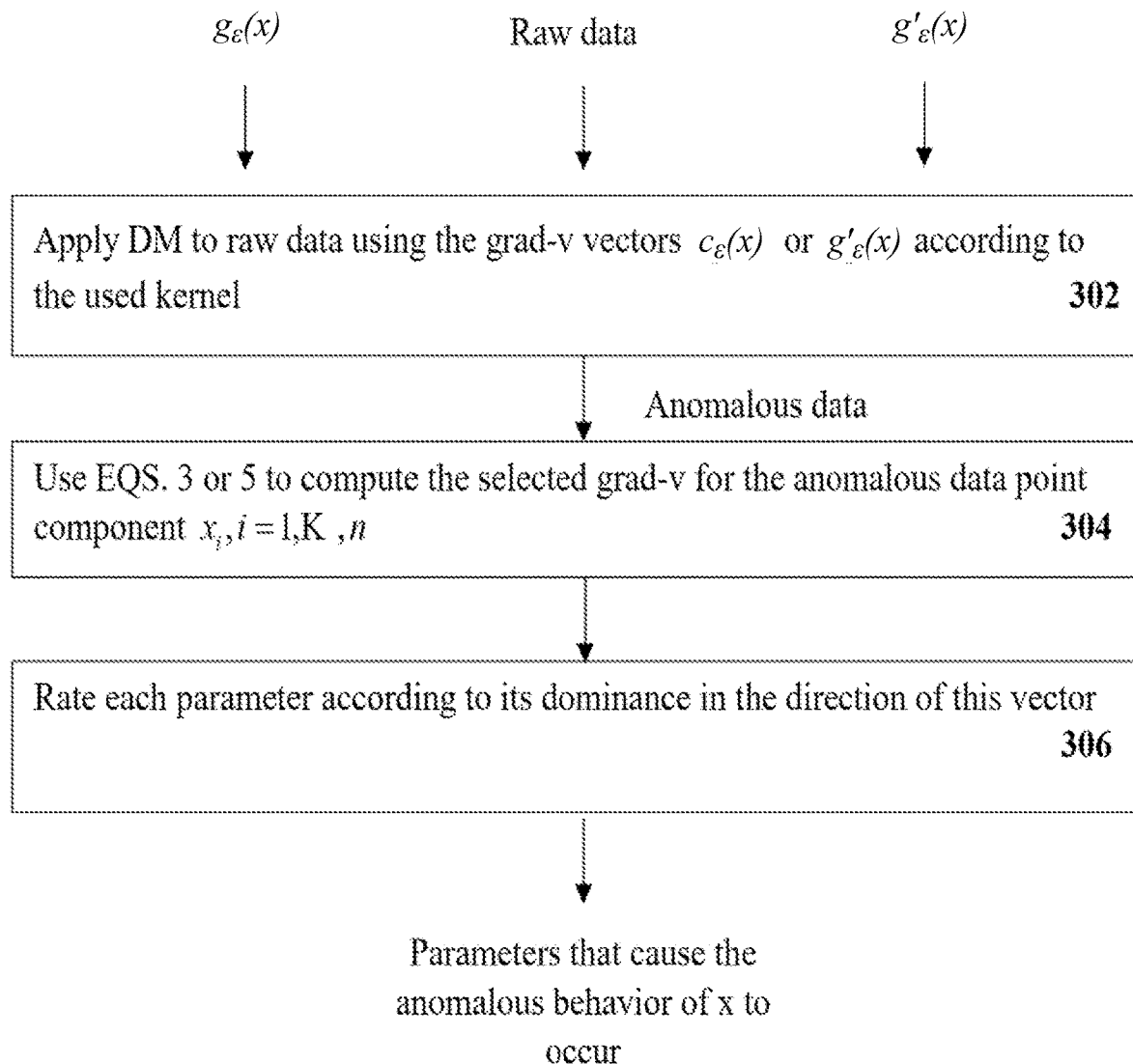
FIG. 3 illustrates in a flow chart a method for rating parameters that cause the anomalous behavior of x to occur.

The vectors defined in EQS. 3 and 5, (i.e. grad-v) are utilized for rating the original parameters according to their contributions to anomalous behaviors of newly arrived datapoints. FIG. 3 describes steps in the rating for an anomaly x. The parameter rating algorithm assumes in step 302 that the inputs to the algorithms are the raw data, and either kernel described by EQ. 3 or EQ. 5. The DM is applied to generate the anomalies. If the anomalies are given, the application of DM and thus step 302 can be skipped.

Step 302: when DM is applied to the data, select grad-v $g_\epsilon(x)$ or $g(x)$ (i.e. EQ. 3 or 5) according to the used kernel;

Step 304: use EQS. 3 or 5 to compute a gradient for each parameter of the n parameters of the anomaly $x_i$;

Step 306: rate each parameter according to dominance (strength) of its gradient in the direction of the grad-v comprising the gradients of each of the n parameters.

The rated parameter may be assigned a number, for example normalized to the range 0-1, with 0 representing a smallest contribution to anomalous behavior and 1 representing the largest contribution to anomalous behavior. The rating provided by this method thus reveal the parameters that cause the anomalous behavior of x to occur.

Figure 4:
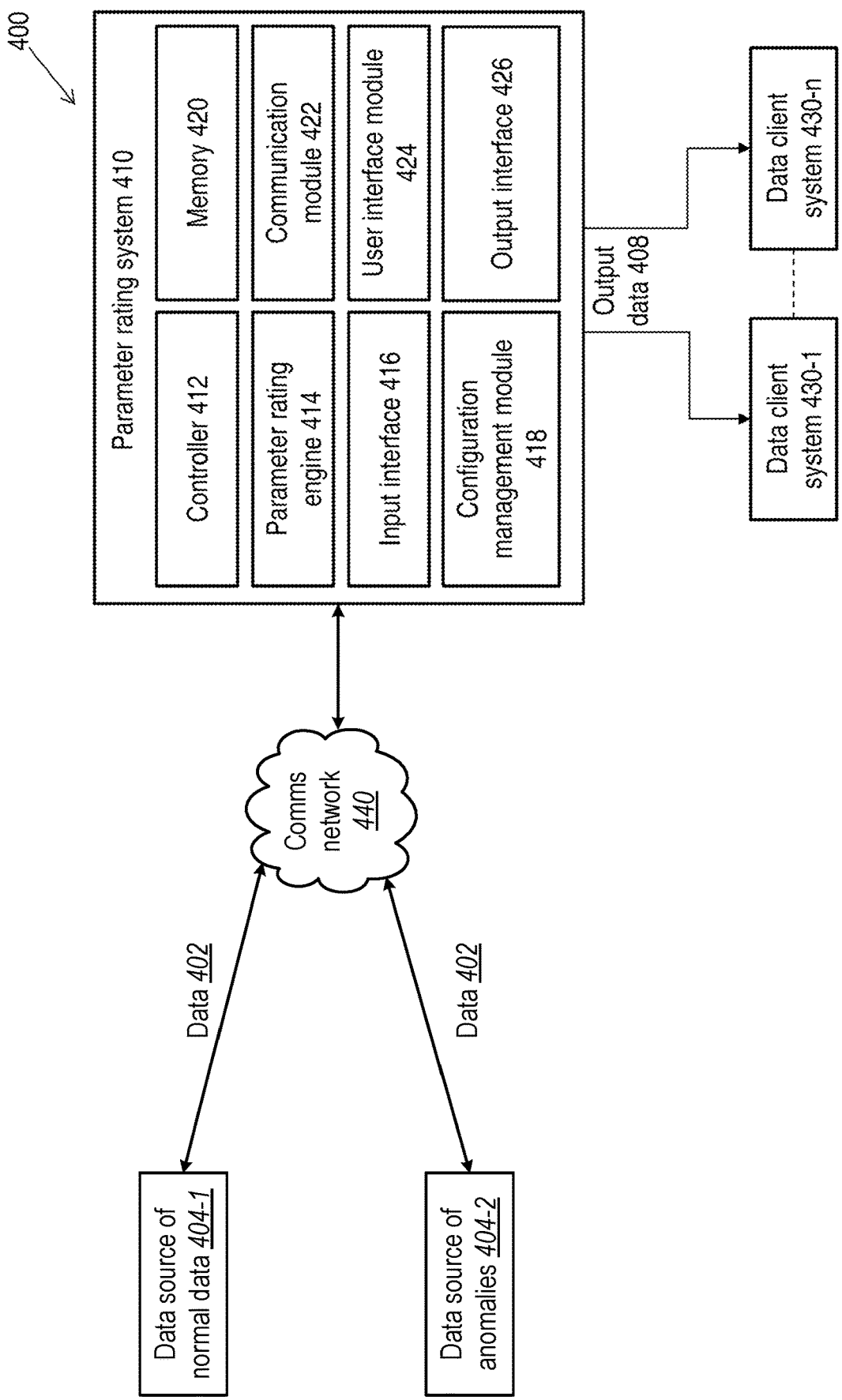
FIG. 4 illustrates a system that can be configured to perform a method disclosed herein.

FIG. 4 illustrates a system numbered 400 that can be configured to perform a method disclosed herein. System 400 may include a parameter rating system 410 configured to calculate a gradient for each parameter of an anomaly $x_i$, and to use the gradient of each parameter of the anomaly $x_i$, to identify the parameter that contributes most to datapoint $x_i$ being abnormal. In some embodiments, data 402 may be provided from data sources 404 to parameter rating system 400. Data 402 includes known anomalies. Data 402 may be of any suitable structure and format and the volume and span (number of parameters) of data 402 may be theoretically unlimited. In some embodiments, varying types and numbers of data sources 404 (shown in FIG. 4 as data source 404-1, 404-2, 404-3 . . . 404-n) may provide data 402. Non-limiting examples of data sources 404 may include networks, sensors, data warehouses, risk systems, audit systems, security events managements systems and/or process control equipment. Data 402 provided by data sources 404 may include but is not limited to, for example, historical data, financial data, sensor data, network traffic data, online data, streaming data, databases, production data and/or the like.

In some embodiments, data sources 404 may be in data communication with parameter rating system 410 via communications network 440. Communications network 440 may include a wide variety of network configurations and protocols that facilitate the intercommunication of computing devices.

Parameter rating system 410 may be a computing device. Parameter rating system 410 may be implemented on a server, distributed server, virtual server, cloud based server, and combinations thereof and may make use of cloud and software as a service (SaaS) processing. Parameter rating system 410 and the modules and components that are included in parameter rating system 410 may include or may be in communication with a non-transitory computer readable medium (such as memory 420) containing instructions that when executed by at least one processor (such as controller 412) are configured to perform the functions and/or operations necessary to provide the functionality described herein. While parameter rating system 410 is presented herein with specific components and modules, it should be understood by one skilled in the art, that the architectural configuration of parameter rating system 410 as shown may be simply one possible configuration and that other configurations with more or fewer components are possible. As referred to herein, the "components" of parameter rating system 410 may include one or more of the modules or services shown in FIG. 4 as being included within parameter rating system 410.

Parameter rating system 410 may include a controller 412. Controller 412 may manage the operation of the components of parameter rating system 410 and may direct the flow of data between the components of parameter rating system 410. Where parameter rating system 410 may be said herein to provide specific functionality or perform actions, it should be understood that the functionality or actions are performed by controller 412 that may call on other components of parameter rating system 410. Controller 412 may be implemented by various types of processor devices and/or processor architectures including, for example, embedded processors, communication processors, graphics processing unit (GPU), soft-core processors and/or embedded processors. In some embodiments, parameter rating system 410 may include memory 420 that may include instructions which, when executed by controller 412 may cause the execution of a method or process described herein.

Parameter rating system 410 may include a parameter rating engine 414. Methods, processes and/or operations for calculating gradients and using it to identify/rate a parameter as above or below may be implemented by parameter rating engine 414. The term "engine" as used herein may also relate to and/or include a computer program module and/or a computerized application and/or one or more hardware, software, and/or hybrid hardware/software modules.

In some embodiments, parameter rating system 410 may include one or more input interfaces 416. Input interface 416 may be configured to ingest and format data 402 and/or 403 for use by parameter rating engine 414. In some embodiments, parameter rating system 410 may include a configuration management module 418 which may be configured to configure parameter rating system 410 such as, for example, to optimize the results of and/or provide judgmental qualitative and quantitative measures on the operation of parameter rating system 410.

In some embodiments, parameter rating system 410 may include a communication module 422 for enabling the transmission and/or reception of data, optionally over communication network 440. Communication module 422 may be used for communicating a notification or alarm related to a detected anomaly. Communication module 422 may include human interface components (not shown) such as a display device for displaying information to a user and input devices such as a touch screen and/or a keyboard and a pointing device (e.g., a mouse or a trackball) by which the user can provide input to the computer. Alarms, notifications and warnings related to anomalies may be provided via the above human interface components.

In use, parameter rating system 410 may filter data 402 and/or 403 to provide output data 408. In some embodiments, output data 408 may be descriptive of analysis results from parameter rating engine 414. In some embodiments, output data 408 may include filtered input data, i.e., input data (402 or 403) which is free or substantially free of anomalies. In some embodiments, output data 408 may include an alarm or alarms. In some embodiments, output data 408 may include notifications about an anomaly or anomalies. In some embodiments, output data 408 may be provided to one or more data client systems 430 (shown in FIG. 4 as data client systems 430-1, 430-2). Data client systems 430 may include computing devices. In some embodiments, output data 408 may be provided to data client systems 430 using a variety of output interfaces 426.

Example

Figure 5A:
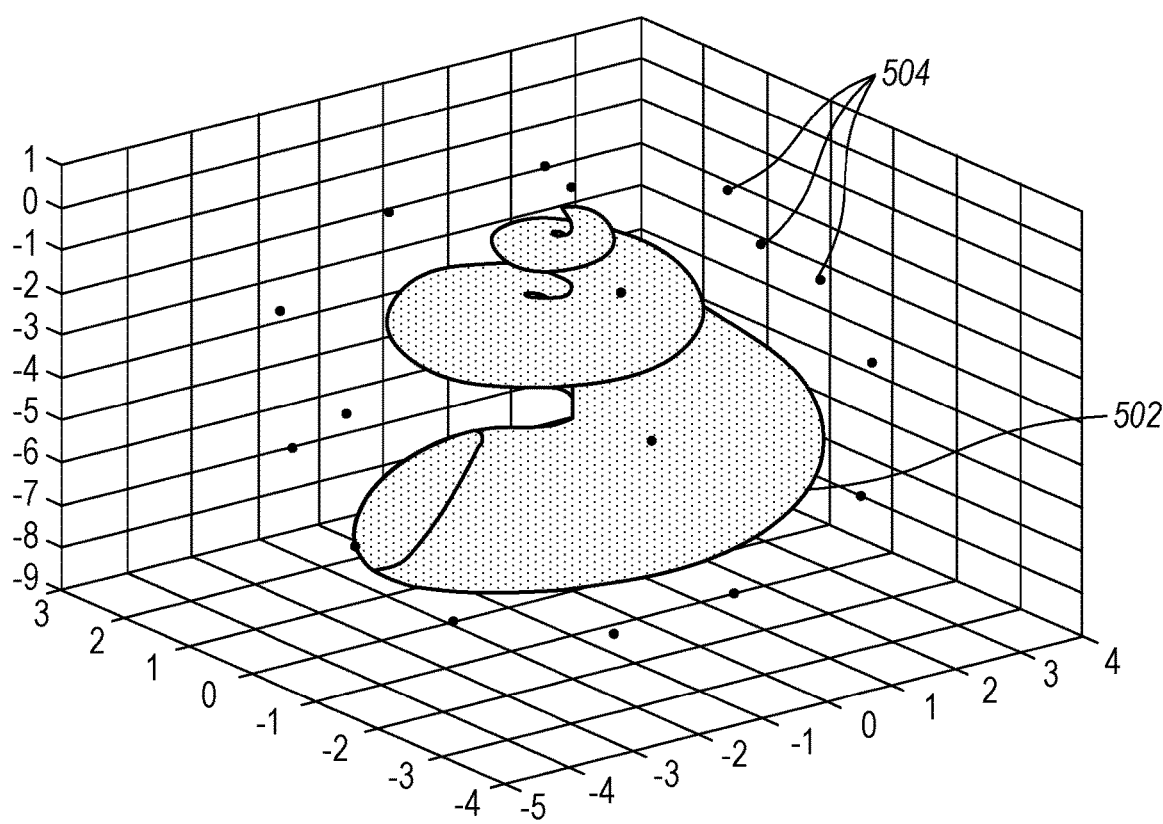
FIG. 5A describes a 3D cluster with surrounding anomalies in original space.
Figure 5B:
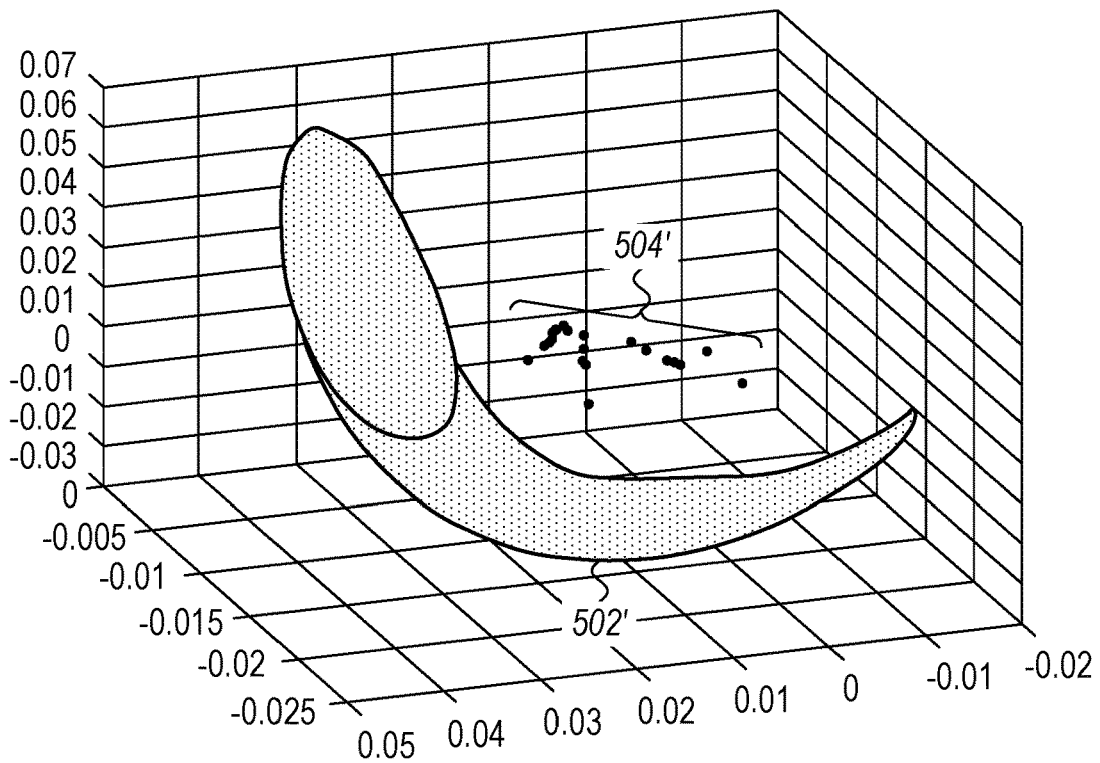
FIG. 5B describes the cluster and the anomalies of FIG. 5A in diffusion space.

FIG. 5A is a simulation that describes isolated datapoints 504 that represent anomalies surrounding a three dimensional (3D) cluster 502 that represents normal data in the original (received data) space. FIG. 5B describes the cluster and the anomalies of FIG. 5A in diffusion space. FIG. 5B shows the 3D cluster and the datapoints in a coordinate system of the three eigenvectors of a diffusion transition matrix as described in the DM methodology. The DM algorithm embeds the original data into a 3D diffusion space, using the first three eigenvectors of the diffusion transition matrix to span the embedded manifold. The application of DM yields embedded datapoints 504' which represent the underlying geometry of cluster (shell) 502', FIG. 5B. The axes in FIG. 5B are the eigenvectors of the diffusion kernel and they represent the anomalies embedded manifold (geometry). Some anomalies 504' are in surrounding areas of the shell 502' and are positioned by the application of the Geometric Harmonics ("GH", R. R. Coifman, S. Lafon, "Geometric harmonics: A novel tool for multiscale out-of-sample extension of empirical functions", Applied and Computational Harmonic Analysis, Volume 21, Issue 1, July 2006, Pages 31-52) algorithm that transforms them into the diffusion. The DM algorithm reveals the two dimensional (2D) nature of the cluster (lying on a 2D manifold in a 3D space) and the generated anomalies.

Figure 6:
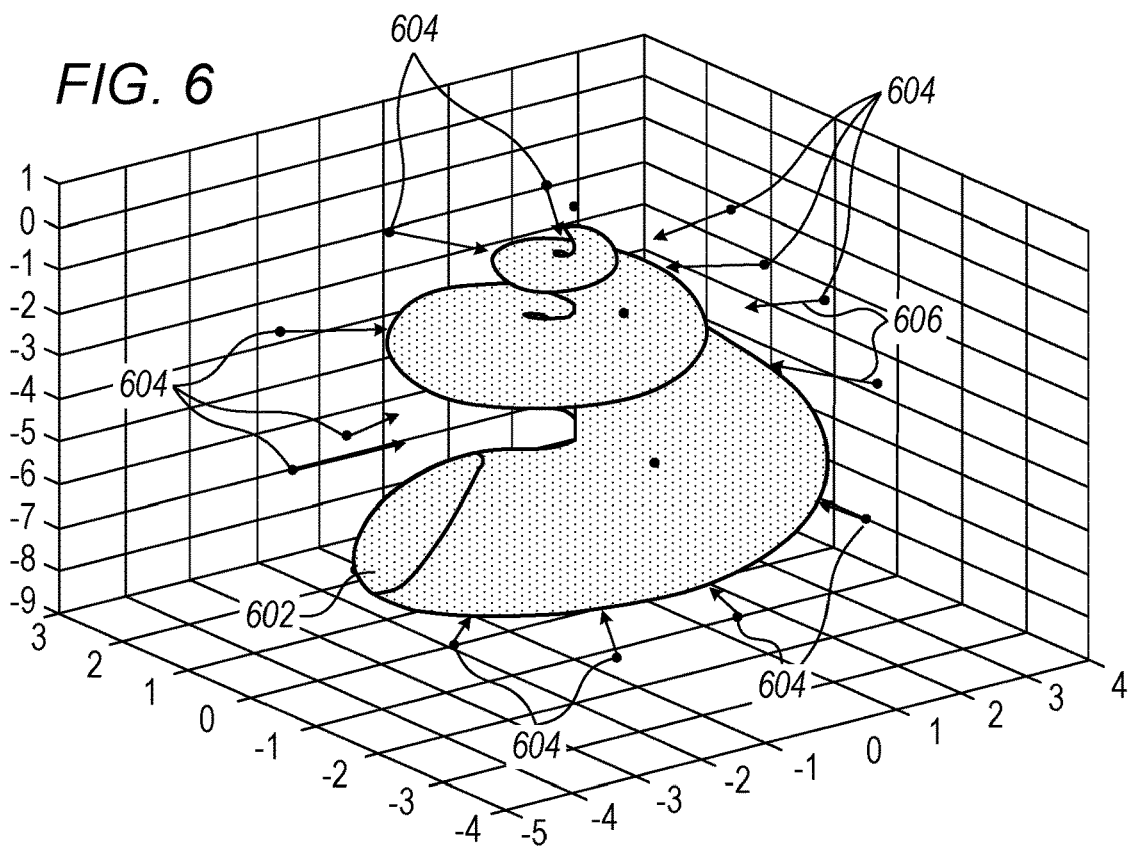
FIG. 6 describes the gradients at the anomalies in the original space.
Figure 7A:
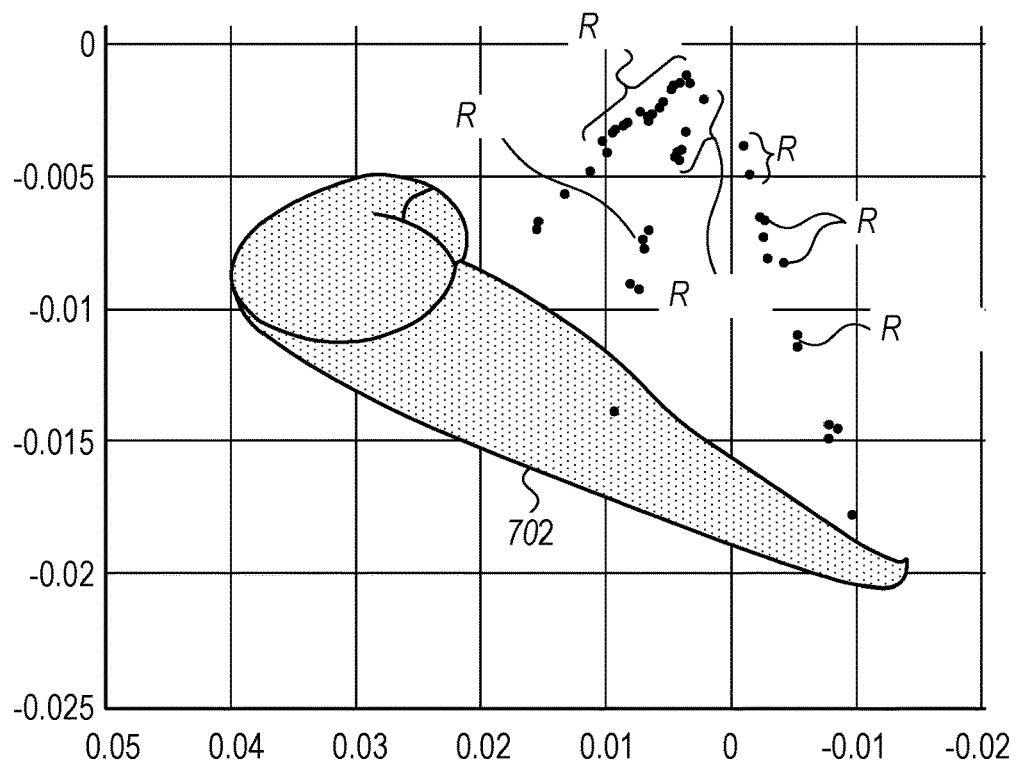
FIG. 7A describes the original anomalies after use of DM to obtain correction by the gradient.
Figure 7B:
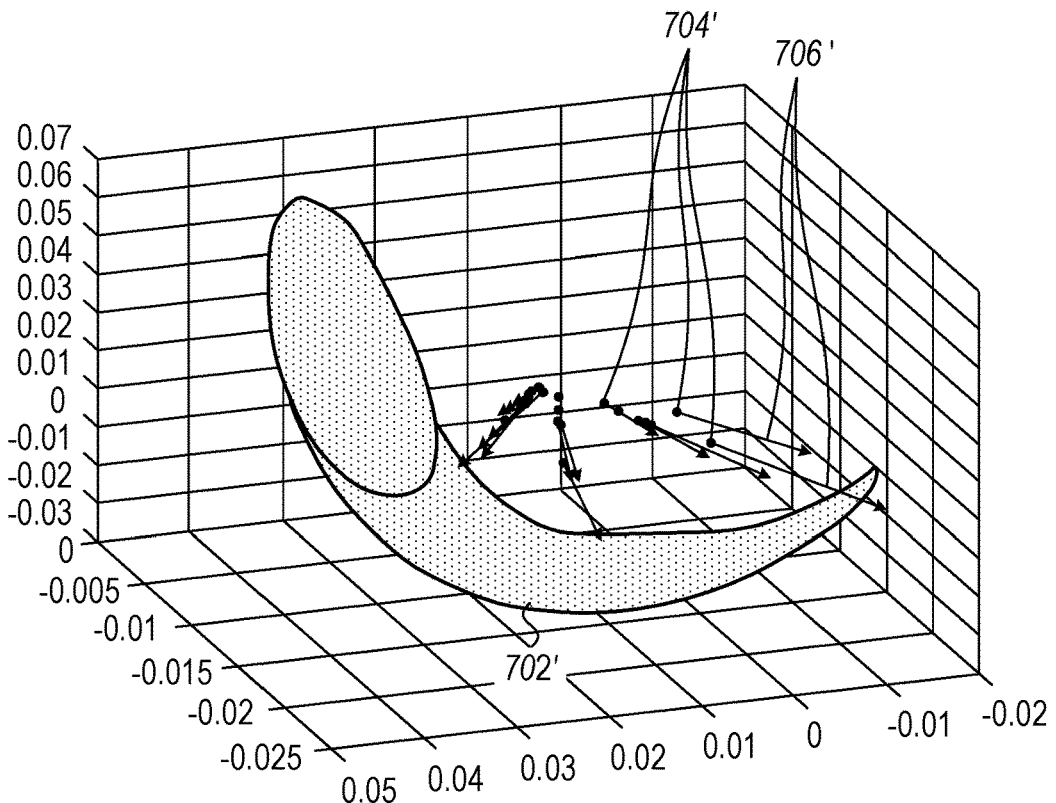
FIG. 7B describes the gradient at the anomalies in the diffusion space.

We calculated the gradient vectors $g_\varepsilon$ (first type of grad-v) by using EQ. 3 at each of the generated anomalous points. We scaled each gradient vector $g_\varepsilon$ by dividing it with the maximal value of its components. The resulting vectors are shown in FIG. 6, which shows scaled gradient vectors 606 at anomalies 604 in the original space. In order to show the effect of the gradient on the transformed datapoints in the diffusion space, we performed the following calculation:

1. For each anomaly x, find the gradient head datapoint $x_h = x + g_\varepsilon(x)$ that represents the head of the gradient vector $g_\varepsilon(x)$ based at x as shown in FIG. 6;
2. Use the GH algorithm to transform each of the original anomalies x to a datapoint $\hat{x}$ in the diffusion space (as already shown in FIG. 7A by R);
3. Use GH to transform each of the gradient head datapoints $x_h$ to a datapoint $\hat{x}_h$ in the diffusion space. The resulting datapoints are shown in FIG. 7A by datapoints that are not marked by R;
4. For each gradient vector $g_\varepsilon(x) = x_h - x$ (going from x to $x_h$) in the original space, draw the corresponding vector $\hat{x}_h - \hat{x}$ (going from $\hat{x}$ to $\hat{x}_h$) in the embedded space. The resulting vectors are shown in FIG. 7B as 706'.

FIG. 7A shows in the diffusion space (from a top-down view), the original anomalies (marked by R) and the datapoints that correspond to the heads of the gradient vectors (not marked by R). FIG. 7B shows gradient vectors 706' as seen in the diffusion space, as well as a shell 702' and anomalies 704'.

In summary—clearly, if an anomaly is reflective of an undesirable event, the identification of the parameter that contributes most to its abnormality assists in the identification of a main factor causing the undesirable effect.

Various embodiments have been presented. Each of these embodiments may of course include features from other embodiments presented, and embodiments not specifically described may include various features described herein.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Any reference in the specification to a method should be applied mutatis mutandis to a system capable of executing the method and should be applied mutatis mutandis to a non-transitory computer readable medium that stores instructions that once executed by a computer result in the execution of the method.

Unless otherwise defined, all technical and scientific terms used herein have the same meaning as commonly understood by one of ordinary skill in the art to which this disclosure belongs. The materials, methods, and examples provided herein are illustrative only and not intended to be limiting.

Implementation of the method and system of the present disclosure involves performing or completing certain selected tasks or steps manually, automatically, or a combination thereof. Moreover, of actual instrumentation and equipment of preferred embodiments of the method and system of the present disclosure, several selected steps could be implemented by hardware or by software on any operating system of any firmware or a combination thereof. For example, as hardware, selected steps of the disclosure could be implemented as a chip or a circuit. As software, selected steps of the disclosure could be implemented as a plurality of software instructions being executed by a computer using any suitable operating system. In any case, selected steps of the method and system of the disclosure could be described as being performed by a data processor, such as a computing platform for executing a plurality of instructions.

While certain features of the disclosure have been illustrated and described herein, many modifications, substitutions, changes, and equivalents may occur to those skilled in the art. It is, therefore, to be understood that the appended claims are intended to cover all such modifications and changes as fall within the true spirit of the disclosure.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A method, comprising:
   receiving a dataset X comprising a plurality of n-dimensional datapoints, wherein each datapoint has n parameters, wherein n≥2, and wherein X includes a normal cluster and an anomaly;
   calculating a gradient for each parameter of the anomaly; and
   using the gradient of each parameter of the anomaly to identify the parameter that contributes most to the abnormality of the anomaly,
   whereby if the anomaly is reflective of an undesirable event, the identification of the parameter that contributes most to its abnormality assists in the identification of a main factor causing the undesirable effect.

2. The method of claim 1, wherein the calculating the gradient for each parameter of the anomaly includes:
   computing a neighborhood $N_\varepsilon(x)$ of the anomaly,
   centralizing $N_\varepsilon(x)$ around the anomaly to obtain a centralized neighborhood $\hat{N}_\varepsilon(x)$ such that the anomaly becomes a new origin and each neighboring datapoint $y \in N_\varepsilon(x)$ becomes $\hat{y} = y - x$, normalizing each $\hat{y} \in \hat{N}_\varepsilon(x)$ to obtain respective normalized vectors $$\frac{\hat{y}}{\|\hat{y}\|},$$

and summing the normalized vectors $$\frac{\hat{y}}{\|\hat{y}\|}$$

to obtain the gradient.

3. The method of claim 1, wherein the calculating the gradient for each parameter $x_i$ of the anomaly includes computing a neighborhood $N_\varepsilon(x)$ of the anomaly, finding a center of gravity $c_\varepsilon$ of abnormal datapoints in $N_\varepsilon(x)$, and identifying a vector going from the anomaly to $c_\varepsilon$ as the gradient.

4. The method of claim 1, wherein the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

5. The method of claim 2, wherein the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

6. The method of claim 3, wherein the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

7. A computer program product comprising: a non-transitory tangible storage medium readable by a processing circuit and storing instructions for execution by the processing circuit for performing a method comprising:
receiving a dataset X comprising a plurality of n-dimensional datapoints, wherein each datapoint has n parameters, wherein n≥2, and wherein X includes a normal cluster and an anomaly;
calculating a gradient for each parameter of the anomaly; and
using the gradient of each parameter of the anomaly to identify the parameter that contributes most to the abnormality of the anomaly,
whereby if the anomaly is reflective of an undesirable event, the identification of the parameter that contributes most to its abnormality assists in the identification of a main factor causing the undesirable effect.

8. The computer program product of claim 7, wherein the calculating the gradient for each parameter of the anomaly includes:
computing a neighborhood $N_\varepsilon(x)$ of the anomaly,
centralizing $N_\varepsilon(x)$ around the anomaly to obtain a centralized neighborhood $\hat{N}_\varepsilon(x)$ such that the anomaly becomes a new origin and each neighboring datapoint $y \in N_\varepsilon(x)$ becomes $\hat{y}=y-x$, normalizing each $\hat{y} \in \hat{N}_\varepsilon(x)$ to obtain respective normalized vectors $$\frac{\hat{y}}{\|\hat{y}\|},$$

and summing the normalized vectors $$\frac{\hat{y}}{\|\hat{y}\|}$$

to obtain the gradient.

9. The computer program product of claim 7, wherein the calculating the gradient for each parameter $x_i$ of the anomaly includes computing a neighborhood $N_\varepsilon(x)$ of the anomaly, finding a center of gravity $c_\varepsilon$ of anomalies in $N_\varepsilon(x)$, and identifying a vector going from the anomaly to $c_\varepsilon$ as the gradient.

10. The computer program product of claim 7, wherein the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

11. The computer program product of claim 8, wherein the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

12. The computer program product of claim 9, wherein the using the gradient of each parameter of the anomaly to identify the parameter that contributes most to the abnormality of the anomaly includes rating each parameter according to the dominance of its gradient in the direction of a gradient vector that includes the gradients of all parameters of the anomaly.

13. A computer system, comprising:
a processor;
a memory communicatively coupled to the processor; and
a parameter rating engine stored in the memory and executable by the processor, the parameter rating engine configured to:
receive a dataset X comprising a plurality of n-dimensional datapoints, wherein each datapoint has n parameters, wherein n≥2, and wherein X includes a normal cluster and anomaly,
calculate a gradient for each parameter of the anomaly, and
use the gradient of each parameter of the anomaly to identify the parameter that contributes most to the abnormality of the anomaly, whereby if the anomaly is reflective of an undesirable event, the identification of the parameter that contributes most to its abnormality assists in the identification of a main factor causing the undesirable effect.

14. The computer system of claim 13, wherein the configuration to calculate the gradient for each parameter of the anomaly includes a configuration to compute a neighborhood $N_\varepsilon(x)$ of the anomaly, to centralize $N_\varepsilon(x)$ around the anomaly to obtain a centralized neighborhood $$\hat{N}_\varepsilon(x)$$

such that the anomaly becomes a new origin and each neighboring datapoint $y \in N_\varepsilon(x)$ becomes $\hat{y}C = y - x$, to normalize each $$\hat{y} \in \hat{N}_\varepsilon(x)$$

to obtain respective normalized vectors $$\frac{\hat{y}}{\|\hat{y}\|},$$

and to sum the normalized vectors $$\frac{\hat{y}}{\|\hat{y}\|}$$

to obtain the gradient.

15. The computer system of claim 13, wherein the configuration to calculate the gradient for each parameter of the anomaly includes a configuration to compute a neighborhood $N_\varepsilon(x)$ of the anomaly and to centralize $N_\varepsilon(x)$ around the anomaly, finding a center of gravity Cg of anomalies in $N_\varepsilon(x)$, and identifying a vector going from the anomaly to c, as the gradient.

16. The computer system of claim 13, wherein the configuration to use the gradient of each parameter of the anomaly to identify the parameter that contributes most to the abnormality of the anomaly includes a configuration to rate each parameter according to the dominance of its gradient in the direction of a gradient vector that includes the gradients of all parameters of the anomaly.

17. The computer system of claim 14, wherein the configuration to use the gradient of each parameter of the anomaly to identify the parameter that contributes most to the abnormality of the anomaly includes a configuration to rate each parameter according to the dominance of its gradient in the direction of a gradient vector that includes the gradients of all parameters of the anomaly.

18. The computer system of claim 15, wherein the configuration to use the gradient of each parameter of the anomaly to identify the parameter that contributes most to the abnormality of the anomaly includes a configuration to rate each parameter according to the dominance of its gradient in the direction of a gradient vector that includes the gradients of all parameters of the anomaly.

\* \* \* \* \*